Patented Oct. 30, 1934

1,978,821

UNITED STATES PATENT OFFICE 1,978,821

PROCESS OF HARDENING CONDENSATION PRODUCTS FROM PHENOLS AND ALDEHYDES

Fritz Schmidt, Troisdorf, near Cologne-on-the-Rhine, Germany

No Drawing. Application September 24, 1932, Serial No. 634,791. In Germany January 23, 1928

7 Claims. (Cl. 260—4)

It has been the practice for some time to add acids to condensation products of phenols and aldehydes, after condensation has begun but prior to complete hardening, for the purpose of accelerating the hardening process and insuring a polymerization of the condensation product to a hard, insoluble end product. In consequence of the thickening of the liquid condensation products, which occurs during this polymerization and increases continuously, stirring of the mass is greatly hampered or even made impossible, particularly under commercial operating conditions and when working with large masses of resin. Consequently, it has hitherto been the practice to allow further hardening of the resin which has already been dehydrated to a considerable extent in the distillation vessel, to proceed by itself, which procedure involves many technical difficulties.

The hardening with very small quantities of acids takes extremely long, and larger quantities of acids cannot be employed because of the resulting known disadvantages, i. e. blistering, etc. Furthermore, particularly with larger quantities of resin there is not a sufficient equalization of temperature throughout the resin and this effect becomes more pronounced as the viscosity of the mass increases. The unequal temperature conditions throughout the resinous mass naturally result in a hardening which is not uniform, i. e., the hardening takes place from outside inwards, or from inside outwards, according to the nature and strength of the acid and the hardening temperature employed. The final result is that non-uniformly hardened products are obtained, which are partly still adhesive and partly excessively hardened, so that a further treatment, as for instance, on rollers or in cutting presses, is impossible, and even pressing to molded articles is made difficult on account of the danger of adhering to the molds. Naturally, the quality of the articles made from such a product suffers considerably from this non-uniform hardening.

The present invention consists in having as small quantities as possible of acid or acid-acting substances, particularly acids or acid anhydrides of phosphorus or dibasic or polybasic organic acids, or hydroxy monobasic acids, or acid salts of the aforementioned acids of phosphorus or the polybasic organic acids, act, for instance, in a kneading machine, upon phenol formaldehyde condensation products which are still liquid while hot, so that all particles continuously renew contact with each other and a thorough exchange of heat and corresponding equalization of temperature is secured. When carrying out the procedure in this manner, a polymerization and further dehydration of the condensation products is obtained which is entirely uniform in character. If desired, one may moderately heat the mass during the kneading operation in spite of the increase in viscosity of the products. When proceeding in this way, the mass becomes plastic much quicker than when allowed to harden by itself. Contrary to the known processes, which yield to viscous, still adhesive mass, the mass obtained according to this process is not adhesive, even when subjected to heat. The mass can now be allowed to cool, in which case it becomes so hard that it can be ground without smearing the mill, and molded articles of any desired kind, as well as plates, can be produced under heat and pressure from the powder, if desired, after it has previously been pressed to form slabs. By previously coloring the powder, as desired, and suitably distributing varicolored powders in the pressure mold, it is also possible to obtain designs of all possible colors when working according to this method. Better effects are obtained, however, by placing the mass, which has not become adhesive, on rollers, coloring and mixing it there in the manner similar to that employed in working up celluloid-like masses, thereupon either pressing the resulting material either directly in molds under heat and pressure to form plates or molded articles, or drawing it in rod or tube presses, while still cold or moderately warm, to form rods or tubes, which can then be further hardened by mere heating. However, if desired, portions can be cut off from the rods after the drawing operation, and these portions can then be pressed under heat and pressure to form buttons, counters and the like.

The important technical progress achieved by the present process therefore consists in (1) An extraordinary acceleration of the hardening of the condensation products in kneading machines, caused by the addition of as small quantities of acid or acid-acting substances as possible, which acceleration is due to the thorough and continuously renewed contact of the particles;

(2) The complete heat exchange assured by the latter, even for great masses still in an entirely viscous, plastic state, i. e. the absence of all local superheating, so that the entire mass assumes a readily distinguishable, well-defined and entirely uniform state, loses its viscosity and can subsequently be treated without any difficulty on rollers and in presses of all kinds, similar to celluloid. Finally, the further dehydration in this hardening process takes place in a perfectly uniform manner, inasmuch as all particles of the mass appear at the surface during the kneading operation with the same regularity.

In this way products of particularly good mechanical and electrical properties are obtained.

*Example 1.*—50 kilos of phenol are condensed in the usual manner with 100 kilos of a 30 per cent. solution of formaldehyde with the addition of 2 kilos of caustic soda. The excess alkali is neutralized with acid, for instance, hydrochloric acid, and the mass dehydrated in a vacuum until the warm residue can still be drawn off from the distillation vessel in the liquid state. The mass is then poured into a kneading machine and to this neutral material is added a small excess of acid, for instance, 2 parts of phosphoric acid or oxalic acid to 100 parts of resin; then the mass is kneaded for about 5 to 6 hours at about 40 to 50° until it has become quite viscous and finally plastic and has lost its adhesiveness completely or nearly completely. The mass is then rolled, colored in various parts on the roller, mixed and the rolled mass pressed in stage-presses under heat and pressure to form plates, or in rod-presses in the cold to form rods which are subsequently further hardened by mere heating. Or the kneaded mass, after cooling, is pulverized, ground and molded into molded articles of any desired kind.

As indicated above the hardening treatment must be carried out under such conditions that only a limited amount of acid or acid-acting substance is present in the mass. The limits of acidity which should preferably be observed correspond to an acidity falling within the pH-range from 2.5 to 5.5. The most desirable range lies between pH 4 and pH 5. If a pH below 2.5 is maintained in the hardening operation unstable masses are obtained which are not storage-proof. Furthermore the results which are obtained within the last mentioned range are very uncertain and as a result a systematic methodical production is quite impossible. If the pH value obtaining during the hardening treatment is above 5.5 then the hardening under pressure and heat proceeds too slowly. Furthermore the molded articles come out of the mold soft and are not sufficiently stable for practical purposes.

*Example 2.*—50 kilos of phenol are condensed with 125 kilos of a 30 per cent solution of formaldehyde with the addition of 0.3 kilos of quick lime and 0.3 kilos of dibutylamine. The resinous mass thus obtained is distilled under a vacuum without neutralizing the alkaline condensing agents, until the mass is almost free from water and can be withdrawn from the distillation vessel in a viscous state, if the mass is still warm. The mass is then poured into a kneading machine, as described in Example 1, and after the addition of a small excess of a suitable acid, as, for instance, phosphoric acid or oxalic acid, is then subjected to further treatment in accordance with Example 1.

*Example 3.*—Instead of employing phosphoric acid as indicated in the processes described in Examples 1 and 2, other acids and acid anhydrides may be used, such as other acids and acid anhydrides of phosphorus, particularly metaphosphoric acid ($HPO_3$), pyrophosphoric acid ($H_4P_2O_7$), hypophosphorus acid ($H_3PO_2$), hypophosphoric acid ($H_4P_2O_6$), phosphoric anhydride ($P_2O_5$), phosphorus anhydride ($P_2O_3$). If acid anhydrides, for instance, phosphoric anhydride ($P_2O_5$), are used, it is advisable to dissolve the anhydrides in alcohol before adding them so that they readily spread throughout the resin. The quantity of the acid or acid anhydride to be added varies according to the pH-value of the particular compound used and further according to the temperature maintained during the hardening process.

*Example 4.*—Instead of using oxalic acid in the processes described in Examples 1 and 2, other polybasic acids may be employed for the hardening of the phenol aldehyde condensation products in accordance with the present process. As indicated above the quantity of the acid used depends, on the one hand, on its pH-value and, on the other hand, on the temperature range of the hardening process. For example, the hardening can be carried out with an addition of 5 parts of succinic acid, or 5 parts of tartaric acid, or 5 parts of citric acid to 100 parts of the resin used, whereas under similar conditions of temperature a smaller quantity (about 2 parts to 100 parts of the resin) of oxalic acid is required, due to its stronger acidic properties (i. e. lower pH-value).

*Example 5.*—Hydroxy monobasic acids (oxy compounds of fatty acids) can also be employed in the procedure set forth in the above examples as, for instance, 5 parts of lactic acid to 100 parts of resin.

*Example 6.*—Besides the inorganic and organic acids or acid anhydrides, respectively, acid salts of these inorganic and organic acids can also be used for the hardening procedure as set forth above, for example, instead of adding phosphoric acid, a primary alkali phosphate, such as $NaH_2PO_4$ or an alkaline earth phosphate, such as $CaH_4P_2O_8$, may be added. In this case, however, a larger quantity, i. e. about 5 to 10 parts of the acid phosphate, is preferably added instead of the smaller amounts of 2 parts of acid to 100 parts of resin, as described in Examples 1 and 2, in order to effect a sufficiently quick hardening. Instead of oxalic acid, for instance, acid calcium oxalate can be used etc., instead of tartaric acid, acid potassium tartrate, the acid salts also being employed in quantities varying according to their pH-value.

It should be expressly stated that the process is not limited to the indicated definite conditions of resin and acids or acid substances, inasmuch as these conditions may vary considerably, depending upon the temperatures prevailing in the kneading machine during the hardening process and the length of time during which it is desired to carry out the hardening operation. It is also quite advantageous to carry out the hardening operation described in the above examples in the presence of certain hardening retarding agents. These hardening retarding agents are added to the resinous mass at some stage of the hardening process described above, and their addition serves to materially simplify the hardening operation and to improve the final products. As examples of hardening retarding agents which may be added during the hardening in the presence of excess acid may be mentioned: polyhydric alcohols, for instance, glycol, glycerine, sorbitol etc., also their esters, more especially those in which one or more hydroxyl groups are free, such as for instance, mono-glyceride of propionic acid, diacetin, etc., also ether alcohols of the same, such as for instance, glycerine ether alcohol, sorbitol ether alcohol, glucose ether alcohol; finally ethylurethane, acetanilide and other substances. The reasons for the favorable action of the added hardening retarding agents are not definitely understood but it is possible that at some stage of this improved hardening operation the small amounts of acid added, as described in the above examples, are almost completely esterified, so that the end products show no detrimental effect either with respect to their stability to light or in their alcoholic properties as compared with phenol-resins condensed by neutral or alkaline agents. The working up of the products with steam and, after hardening, is greatly facilitated by the addition of these hardening retarding agents, since it is not necessary to observe strict control of the temperature in the rolling and kneading operations as must be done when the hardening with excess acid is carried out without the addition of hardening retarding agents.

The favorable action of other additions, for instance, that of ethylurethane has not yet been explained; generally it has been found, however, that those agents have a particularly favorable effect along the lines indicated above, which at the same time have a clarifying action on the phenol-formaldehyde products, that is to say, give a translucent material, while the colorless normal product without additions is non-transparent and chalky white. In many cases it has been found particularly advantageous to use mixtures of the above mentioned additions, as is done in the following example.

*Example 7.*—As described in the first two sentences of Example 1 above, there are added per 1 kilogram resin 60 ccms. glycerine (dissolved in 100 ccms. acetone) in the kneading machine and then 2% (= 10 grams) phosphoric acid kneaded in as in the example above referred to until the mass has become so viscous that it can be drawn into threads in kneading. In addition, a further 100 grams monoglyceride of propionic acid are now added and kneaded until the mass has lost its stickiness and detaches from the kneading blades. The further working up of the product may be effected in the manner described in Examples 1 and 2 above.

Any of the above mentioned hardening retarding agents may be added to the resinous mass at some stage of the hardening operation, as described in Examples 2 to 6 above.

The special type of acid hardening with or without the accompanying hardening retarding agents described above is particularly adapted for the production of filled pressing mixtures which yield pressed articles which are pure white and which yellow only very little and quite slowly on exposure to light, or which may be colored bright delicate shades. Up to the present time it has not been possible to produce pressed articles of this character from phenol-formaldehyde resins owing to the strong color variations which take place either during the production of the condensation product, or of the pressing powder, or during the pressing operation, or after a short exposure to daylight. The new pure white products may be obtained by simply kneading in cellulose, or other pure white fibrous materials, or white mineral fillers, or pigments into the resinous mass during any of the kneading operations described above. If it is desired to obtain bright colored articles, bright colored fibrous materials, or mineral fillers, or pigments may be admixed with the resinous mass. Fibrous materials may, of course, be also employed in admixture with mineral fillers or pigments.

*Example 8.*—50 kilos of a resol, (i. e., a condensation product of phenol and formaldehyde capable of being hardened and which has been condensed under alkaline conditions and after the neutralization of excess alkali thoroughly dehydrated) are mixed with 1 kilogram of phosphoric acid and 3 kilos of glycerin in a kneading machine. Further kneading is carried out for a short time at about 50° C. until the resin has become viscous. 5 kilos of glycerin monopropionic acid ester and 30 kilos of cellulose are then introduced at somewhat rising temperature and the now flaky mass, finally becoming more compact again, is further kneaded for two to three hours until it has lost its adhesiveness. In order to produce definite colors, the mixture is then rolled for a short time and any desired pigments homogeneously admixed. Before pressing, the rolled material is preferably ground and shaped into tablet form; the pressing to shaped articles is effected at 120 to 140° C. in a few minutes.

*Example 9.*—The resinous mass described in Example 2 may, after the preliminary kneading with phosphoric or oxalic acid, be further kneaded after the addition of 30 kilos of cellulose, and further worked up as described in Example 8. In a similar manner, additions of cellulose or other fibrous materials, or mineral fillers or suitable pigments, may be effected during the kneading processes of Examples 3 to 7, and the product worked up as described in Example 8.

This application is in part a continuation of my co-pending applications Serial Nos. 327,754, now Patent 1,927,375, 327,755, and 506,499.

I claim:

1. A method of preparing phenol-aldehyde condensation products which may be molded which comprises forming a preliminary condensation product from a phenol and an aldehyde under alkaline conditions, adding thereto a sufficient amount of an acid substance so that a pH of between 2.5 and 5.5 is maintained during the hardening operation, and hardening said product by heating thoroughly and continuously kneading the entire mass until the latter has become plastic and has lost its stickiness.

2. A method of preparing phenol-aldehyde condensation products which may be molded which comprises forming a preliminary condensation product from a phenol and formaldehyde under alkaline conditions, and hardening said product by heating and thoroughly and continuously kneading the entire mass until the latter has become plastic and has lost its stickiness while maintaining an acidity of between pH 2.5 and 5.5 throughout the course of the hardening operation.

3. A method of preparing phenol-aldehyde condensation products which may be molded which comprises forming a preliminary condensation product from a phenol and formaldehyde under alkaline conditions, adding thereto a sufficient amount of an acid selected from the group consisting of polybasic organic carboxylic acids and hydroxy monobasic organic carboxylic acids, so that a pH of between 2.5 and 5.5 is maintained during the hardening operation, and hardening said product by heating and thoroughly and continuously kneading the entire mass until the latter has become plastic and has lost its stickiness.

4. A method of preparing phenol-aldehyde condensation products which may be molded which comprises forming a preliminary condensation product from a phenol and formaldehyde under alkaline conditions, adding thereto a sufficient amount of succinic acid so that a pH of between 2.5 and 5.5 is maintained during the hardening operation, and hardening said product by heating and thoroughly and continuously kneading the entire mass until the latter has become plastic and has lost its stickiness.

5. A method of preparing phenol-aldehyde condensation products which may be molded which comprises forming a preliminary condensation product from a phenol and formaldehyde under alkaline conditions, adding thereto a sufficient amount of tartaric acid so that a pH of between 2.5 and 5.5 is maintained during the hardening operation, and hardening said product by heating and thoroughly and continuously kneading the entire mass until the latter has become plastic and has lost its stickiness.

6. The product obtainable in accordance with the process set forth in claim 1.

7. A product obtainable by forming a preliminary condensation product from a phenol and an aldehyde under alkaline conditions, adding thereto a sufficient amount of an acid substance, so that a pH of between 2.5 and 5.5 is maintained during the hardening operation, hardening said product by heating thoroughly and continuously kneading the entire mass until the latter has become plastic and has lost its stickiness, a hardening-retarding agent selected from the group consisting of polyhydric alcohols, esters of polyhydric alcohols, alcohol ethers, ethyl urethane and acetanilide being present during at least part of the hardening operation.

FRITZ SCHMIDT.